Patented June 5, 1923.

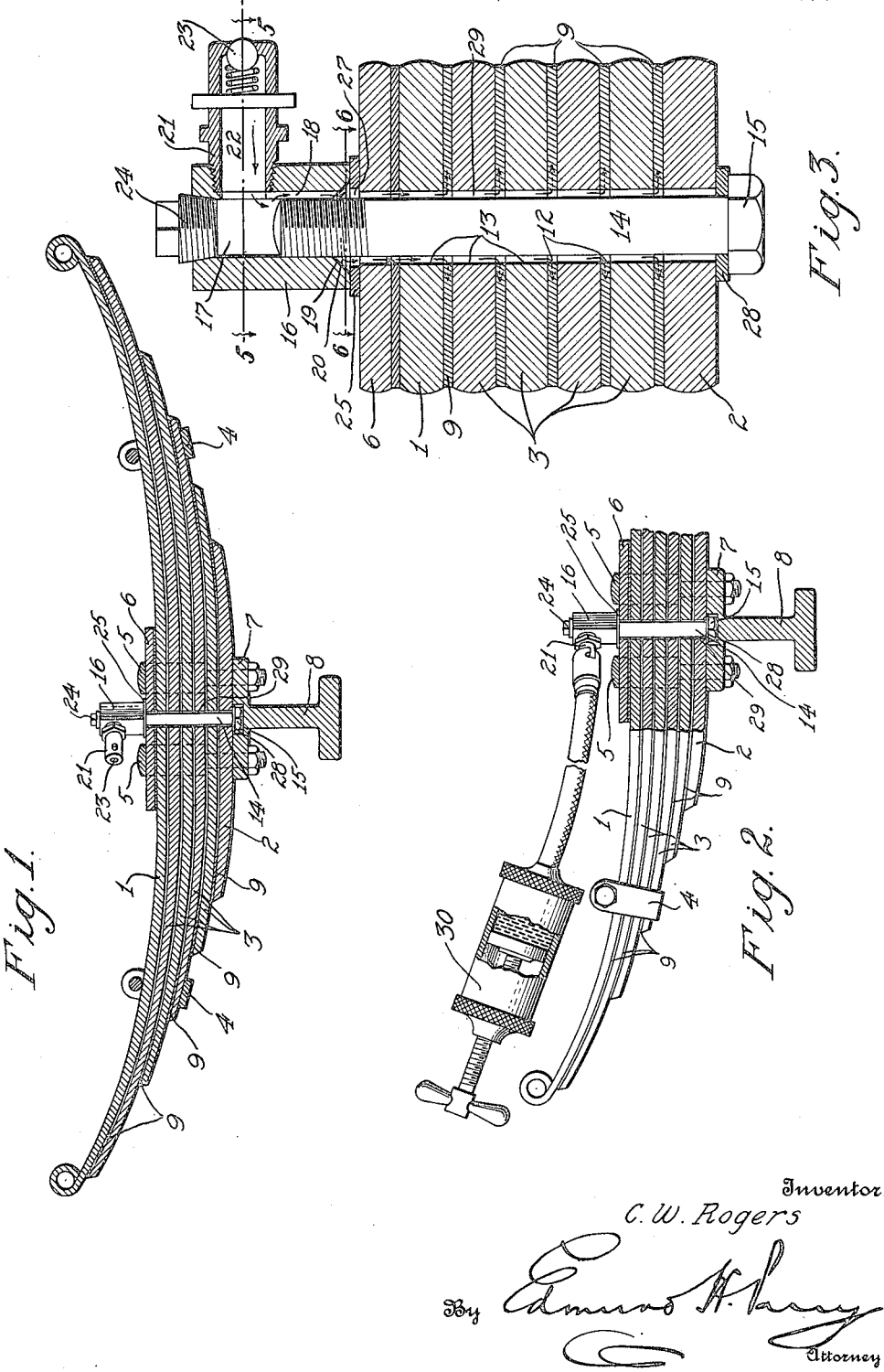

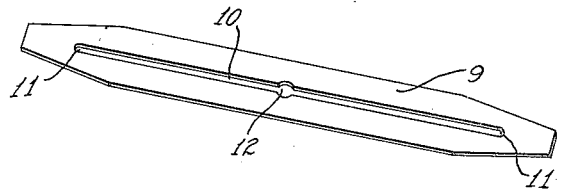
Fig. 4.
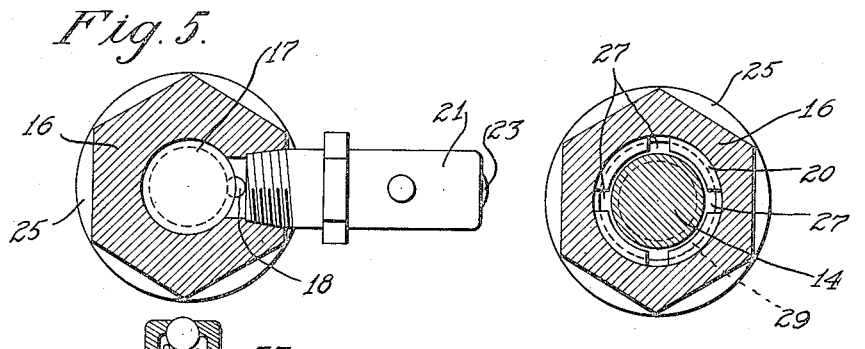
Fig. 5.
Fig. 6.
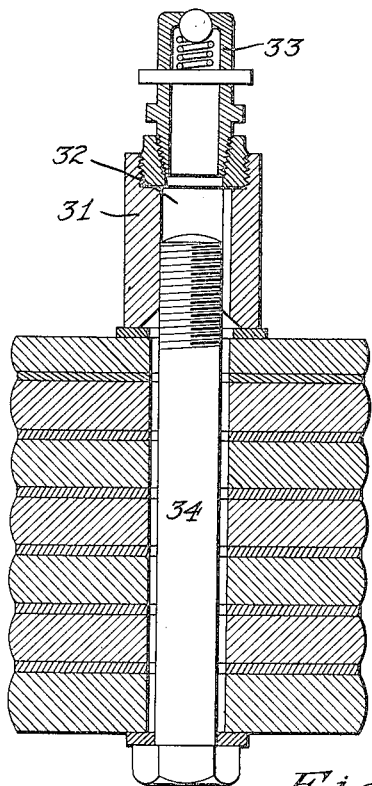
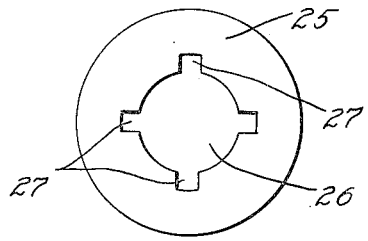
Fig. 7.
Fig. 8.

1,457,856

UNITED STATES PATENT OFFICE.

CARLYLE W. ROGERS, OF WARREN, PENNSYLVANIA.

SPRING STRUCTURE.

Application filed March 1, 1922. Serial No. 540,283.

*To all whom it may concern:*

Be it known that I, CARLYLE W. ROGERS, a citizen of the United States, residing at Warren, in the county of Warren and State of Pennsylvania, have invented certain new and useful Improvements in Spring Structures, of which the following is a specification, reference being had therein to the accompanying drawing.

This invention relates to spring structures, and more particularly to means associated with spring leaves or laminæ for maintaining such leaves or laminæ efficiently lubricated at all times.

One of the primary objects of the invention is to provide a lubricating structure adapted to be introduced into an existing spring structure without materially modifying the spring structure where the latter includes a series of superposed spring leaves or laminæ provided with an aperture or bolt-hole near its central portion, and between which leaves are interposed a series of insert elements likewise provided, near their central portions, with apertures, such apertures in the leaves and insert elements constituting a lubricant duct, with which is associated my improved lubricating structure comprising (generally speaking) a nut-member formed with an internal chamber, with which communicates a chamber in a check-nipple governed by a spring-controlled closure, and a bolt member extending into the nut-member and of less diametral dimensions than the duct formed by the apertures in the spring leaves and insert elements, combined with means for making the structure leak-proof.

A further object of the invention is to provide a spring structure comprising a plurality of spring leaves or laminæ; a plurality of leaf-spacers or inserts, one between two proximate leaves; the leaves and inserts being each provided with a central aperture and all of such apertures constituting a lubricant duct; a nut member associated with one of the spring leaves and formed with a chamber and with a groove paralleling and communicating with the chamber and also with the lubricant duct; a check-nipple extending into the nut-member and formed with an internal chamber communicating with the chamber in the nut-member and provided with a spring-controlled closure; a bolt member extending into the nut-member and of less diametral dimensions than the lubricant duct; said insert members being provided with elongated slots communicating with the lubricant duct; the bolt member being provided with a head adapted to engage a gasket interposed between the head and one of the spring leaves to close the lubricant duct at one end; and a gasket interposed between the nut-member and another of the leaves and provided with one or more slots registering with the duct; the aggroupment of these parts being such that when lubricant is introduced into the nut-member through the check-nipple—preferably under high pressure—such lubricant will flow from said chamber through the groove in the nut-member and through the slots in the gasket, and thence into the lubricant duct, and thence through the slots in the inserts, and gradually work between the leaves and the inserts, whereby the spring structure, as a whole, will be effectually lubricated.

The present invention involves an improvement on, and a carrying forward of, the inventive-concept of United States Patent No. 1,185,940, granted June 6, 1916, to John W. Reifsnider, for vehicle spring lubricators; the herein-described improvement contemplating, primarily, a more effective media for insuring, initially, the introduction of the lubricant into the structure and, then, its effective distribution over the contacting surfaces of the spring leaves or laminæ.

In the accompanying drawings, I have illustrated my improvement in two forms; but it is to be understood that in thus revealing two embodiments thereof, my invention is not limited thereto, and that these special embodiments are susceptible of a wide range of variation and modification without departing from the salient features of the invention.

In these drawings:

Figure 1 is a view in vertical longitudinal section of a spring structure constructed in accordance with my invention;

Fig. 2 is a fragmentary view, partly in vertical longitudinal section and partly in elevation, of the spring structure with a lubricant-introducing grease or oil gun operatively associated therewith;

Fig. 3 is a fragmentary view, on an enlarged scale, in vertical transverse section, showing the aggroupment of the nut and bolt members, the direction of flow of the lubricant being indicated by arrows;

Fig. 4 is a perspective view of one of the metal insert elements which spaces two leaves from each other;

Fig. 5 is a view in vertical horizontal section, on the line 5—5, Fig. 3;

Fig. 6 is a similar view on the line 6—6, Fig. 3;

Fig. 7 is a view in plan of one of the gaskets; and

Fig. 8 is a view in sectional elevation of a modified form of structure.

Referring to these drawings and to Fig. 1, the reference-numeral 1 designates an upper or outer spring leaf; 2 a lower or outer spring leaf; and 3 intermediate leaves. These leaves or laminæ are of usual construction and, when aggrouped, constitute a spring structure of the usual elliptical, semi-elliptical, or quadri-elliptical type. These leaves are secured in any appropriate way, as by clips or U-bolts 4—4 and 5—5. In this instance, the U-bolts 5 embrace a top plate 6 and extend through a flange 7 of an axle 8.

Interposed between the outer spring leaves and each of the intermediate leaves is an insert element 9, shown detached in Fig. 4. This insert is of substantially the same widthwise dimensions as the spring leaves and is of a lengthwise dimension corresponding to the spring leaf underlying or overlying the same. The inserts are formed with an elongated slot 10 having its end walls 11 adjacent the ends of the inserts. The slot 10 preferably is comparatively narrow and is enlarged centrally to form an opening or passage 12.

Each of the outer and intermediate spring leaves is provided with an aperture or opening 13, preferably formed therein centrally, and of substantially the same dimensions as the opening 12 in each of the insert elements. Extending through the plate 6 and the openings 12 in the insert elements and the openings 13 in the spring leaves is a bolt member 14 having a head 15 on one end.

On the opposite end of the bolt is a nut-member 16—in this instance shown hexagonal—and formed with an internal chamber 17 and with an elongated slot 18 which parallels and communicates with the chamber 17, as shown in Fig. 3. The open end of the nut-member 16 is countersunk, as at 19, to form a space 20 with which the groove 18 communicates. Threaded into or otherwise secured to the nut-member is a check-nipple 21 formed with an internal chamber 22 that communicates with the chamber 17 in the nut-member, and having a spring-controlled closure 23 for maintaining the chamber 22 normally closed from the outside.

In some instances, a tap element 24 is threaded into the upper end of the nut-member so that, when removed, access to the chamber 17 may be had, to clean the same, for instance; or the nipple may be inserted in the bolt-hole where is shown the tap element 24.

Interposed between the countersunk end of the nut-member and the spring leaf 1 is a gasket 25 provided with a central aperture 26 from which radiate slots 27.

Interposed between the bolt-head 15 and the spring leaf 22 is a gasket 28.

When the leaves and inserts are grouped, with their openings 12 and 13 in register, there is thereby formed a lubricant passage or duct 29 with which the slots 27 of the gasket 25 register and with which the space 20 and the groove 18 register. Thus, a clear passage is formed between the chamber 17 and the slots 10 in the inserts 9. The gasket 25 prevents leakage of the lubricant between the nut-member and the spring leaf 1, while the gasket 28 closes one end of the duct 29 against escape of lubricant between the leaf 2 and the head 5.

Operation: The mode of operation of the structure will now be obvious. Assuming that a suitable lubricant is, by high pressure of a grease or oil gun 30, forced through the check-nipple 21 into the chamber 17— the spring closure 23 being opened by the pressure of the lubricant to permit the flow thereof through the nipple and into the chamber 17—such lubricant then travels from the chamber through the groove 18 into the space 20 formed by the countersunk end 19, thence through the radial slots 27 in the gasket 25 into the duct or passage 29 from which it is distributed through the slots 10 in the inserts 9, and gradually works itself between the inserts and the spring leaves effectually to lubricate the entire structure.

In Fig. 8, I have shown a modified form of structure, such modification involving the provision in the nut-member 31 of a bolt-hole 32 extending entirely through the nut-member, one end of the bolt-hole being closed by a check-nipple 33, while the other end of the bolt-hole is closed by a bolt 34. The structure, otherwise, is similar to that already described in reference to the first embodiment.

In actual practice, this structure has been demonstrated to be particularly useful in certain situations and particularly where it is desirable not to increase the bolt-holes through the spring leaves and inserts and where it is desirable to introduce the lubricant into the spring structure intermediate of the central bolt which holds the spring leaves and inserts together.

The lubricating structure, herein revealed, and comprising the nut-member, the bolt member extending thereinto, the check-nipple mounted on or in the nut-member, the gaskets encompassing the stem of the bolt member, etc., constitutes an article of manufacture which, as an entity or unit, may be sold as such.

What I claim is:

1. A spring-structure comprising superposed leaves; a spacer-element disposed between the facing surfaces of certain of the leaves, said spacer-element comprising a body shaped to conform approximately with the edge contour of one of the leaves between which it is placed and provided with an elongated cut-out portion having side and end walls and a centrally disposed enlarged portion for the reception of a bolt; a bolt of smaller external cross-sectional area than the centrally disposed enlarged portion of the insert members passing through the leaves and insert members in spaced relation thereto to constitute a channel between the outer surface of the bolt and the walls of the opening through which the bolt passes and communicating with the elongated cut-out portion of the insert members; a head on one end of the bolt; a nut on the other end provided with a lubricant receiving and storing chamber; means, including a groove provided in one of the members, establishing communication between the lubricant receiving and storing chamber and the space between the bolt and spring leaves; and a cut-away portion of the nut, communicating with the groove, and constituting a distributing space for lubricant passing through the groove.

2. As an article of manufacture, a spring lubricating structure including a nut-member provided with an internal chamber and with an elongated groove paralleling and communicating with the chamber, a check-nipple extending into the nut-member and formed with a chamber communicating with the chamber in the nut-member and provided with a spring-controlled closure normally maintaining the chamber in the nipple closed, a bolt member extending into the nut-member at one side of the groove and leaving the same open at one end, the bolt member having a head, a disc encompassing the bolt member at one side of the head and constituting a gasket provided with a series of radial slots, a gasket engageable with the head, and a tap element threaded into the end of the nut-member opposite to the bolt member.

3. A spring structure including a plurality of superposed leaves; a series of insert elements interposed between the leaves and of approximately the same widthwise dimensions as the leaves and substantially of the lengthwise dimensions of some of the leaves; the leaves and elements being provided, adjacent their central portions, with a lubricant duct; a nut-member associated with one of the leaves and provided with an internal chamber communicating with the lubricant duct and having one end countersunk and formed with a groove extending into the countersunk portion of the nut-member; a check-nipple on the nut-member and formed with an internal chamber communicating with the chamber in the nut-member and having a spring-controlled closure for the chamber; a gasket interposed between the nut-member and one of the leaves and formed with a slot registering with the lubricant duct; and a gasket interposed between the nut-member and another of the leaves and constituting a closure for one end of the lubricant duct.

In testimony whereof I affix my signature in presence of two witnesses.

CARLYLE W. ROGERS.

Witnesses:
ARCH DAVIDSON,
E. R. AUDET.